US008204381B2

(12) United States Patent
Green et al.

(10) Patent No.: US 8,204,381 B2
(45) Date of Patent: Jun. 19, 2012

(54) BROADBAND RADIO TRANSCEIVER WITH OPTICAL TRANSFORM

(75) Inventors: Evan R. Green, Beaverton, OR (US); Mario J. Paniccia, Santa Clara, CA (US); Sean M. Koehl, Mountain View, CA (US); Richard Jones, Santa Clara, CA (US); Guy S. Anthony, Hillsborough, CA (US)

(73) Assignee: Intel Corporation, Santa Clara, CA (US)

( * ) Notice: Subject to any disclaimer, the term of this patent is extended or adjusted under 35 U.S.C. 154(b) by 2494 days.

(21) Appl. No.: 10/749,184

(22) Filed: Dec. 30, 2003

(65) Prior Publication Data
US 2005/0227653 A1 Oct. 13, 2005

(51) Int. Cl.
*H04B 10/00* (2006.01)
(52) U.S. Cl. .......... 398/115; 398/140; 398/135; 398/79; 398/76; 455/561; 455/562.1; 455/230; 455/450; 370/503; 370/537; 370/210; 370/536; 375/296; 375/260
(58) Field of Classification Search .................. 398/115, 398/116, 119, 128, 130, 135, 136, 138, 139, 398/183, 188, 186, 192, 193, 194, 202, 204, 398/212, 214, 140, 141, 127, 66, 68, 76, 398/79, 96, 103, 118, 182, 208, 158, 159, 398/75; 455/561, 562.1, 230, 450, 522; 370/503, 370/536, 537, 342, 210, 328, 351, 442, 538; 375/296, 260, 316, 297, 295
See application file for complete search history.

(56) References Cited

U.S. PATENT DOCUMENTS

| 6,094,285 A * | 7/2000 | Wickham et al. ............... 398/1 |
| 6,137,612 A * | 10/2000 | Startup ........................ 398/199 |
| 6,990,155 B2 * | 1/2006 | Adachi et al. ................ 375/298 |
| 7,043,271 B1 * | 5/2006 | Seto et al. .................. 455/562.1 |

(Continued)

FOREIGN PATENT DOCUMENTS

WO    WO-2005067183    7/2005

OTHER PUBLICATIONS

European Patent Office, International Search Report and Written Opinion for International Application No. PCT/US2004/043686, 12 pages, May 2, 2005.

(Continued)

*Primary Examiner* — Hanh Phan
(74) *Attorney, Agent, or Firm* — Blakely, Sokoloff, Taylor & Zafman LLP (57) ABSTRACT

A broadband receiving apparatus includes an antenna to receive a radio signal having a plurality of modulation frequencies. An amplifier drives a laser source from the broadband radio signal to produce an optical signal having a plurality of spectral components. A diffraction grating transforms the optical signal into its spectral components. An array of photo-detectors converts the spectral components into electronic signals corresponding to the plurality of modulation frequencies. A transmitting apparatus includes an array of coherent laser emitters driven by electronic signals corresponding to a plurality of modulation frequencies to produce optical signals corresponding to a plurality of spectral components. A diffraction grating inverse transforms the spectral components into a composite optical signal. A photo-detector converts the composite optical signal into a composite electronic signal including the plurality of modulation frequencies. An amplifier amplifies the composite electronic signal for transmission as a broadband radio signal.

32 Claims, 7 Drawing Sheets

U.S. PATENT DOCUMENTS

| | | | |
|---|---|---|---|
| 7,085,497 B2 * | 8/2006 | Tiemann et al. | 398/107 |
| 7,245,833 B1 * | 7/2007 | Volkening | 398/116 |
| 7,349,633 B2 * | 3/2008 | Lee et al. | 398/115 |
| 2002/0126338 A1 | 9/2002 | Volpi et al. | |
| 2003/0147655 A1 | 8/2003 | Shattil | |
| 2003/0202794 A1 | 10/2003 | Izadpanah et al. | |
| 2011/0091218 A1 * | 4/2011 | Green et al. | 398/116 |

OTHER PUBLICATIONS

Kusuma, Julius et al., "Sampling with Finite Rate of Innovation: Channel and Timing Estimation for UWB and GPS," 2003 IEEE International Conference on Communications, vol. 1, pp. 3540-3544, May 11, 2003.

Robert G. Aiello, Invited—Challenges for Ultra-Wideband (UWB) CMOS Integration, Discrete Time Communications, INc. San Diego, CA 92128, 2003 IEEE MTT-S Digest, Doc. No. 0-7803-7695-1/03, 2003 IEEE.

Urs U. Graf, Stefan Heyminck, Fourier Gratings as THz Local Oscillator Multiplexer, Kosma, I. Physikalisches Institut, Universitat zu Koln, Zulpicher Str. 77, 50937 Koln, Germany, 1999.

Pierre Gandolfo (XtremeSpectrum), James Allen (Appairent Technologies), 802.15.3 Overview/Update, WiMedia Presentation, Oct. 2002.

Anuj Batra (Texas instruments) "Multi-band OFDM Physical Layer Proposal," Project: IEEE P802.15 Working Group for Wireless Personal Area Networks (WPANs), Doc. No. IEEE 802.15-03/267r6, Sep. 17, 2003.

Anuj Batra et al., (Texas Instruments), "Multi-band OFDM Physical Layer Proposal for IEEE 802.15 Task Group 3a," Project: IEEE P802.15 Working Group for Wireless Personal Area-Networks (WPANs), Doc. No. IEEE 802.15-03/268r2, Nov. 10, 2003.

Roberto Aiello (Staccato Communications), Anand Dabak (Texas Instruments), "Multi-band OFDM Physical Layer Proposal Update," Project: IEEE P802.15 Working Group for Wireless Personal Area Networks (WPANs), Doc. No. IEEE 802.15-03/449r2, Nov. 10, 2003.

Int'l Search Report and Written Opinion for PCT Application No. PCT/US2004/043686 mailed May 2, 2005, 12 pgs.

Office Action for U.S. Appl. No. 12/976,099 mailed Sep. 1, 2011, 10 pgs.

Aiello, Robert G., "Invited—Challenges for Ultra-Wideband (UWB) CMOS Integration", *Discrete Time Communications, Inc.*, San Diego, CA 92128, *2003 IEEE MTT-S Digest*, Doc. No. 0-7803-7695-1/03, 2003 IEEE.

Aiello, Roberto , et al., "Muti-band OFDM Physical Layer Proposal Update", *Project: IEEE 802.15 Working Group for Wireless Personal Area Networks (WPANs)*, Doc. No. 802.15-03/449r2, Nov. 10, 2003.

Batra, Anuj , "Multi-band OFDM Physical Layer Proposal", *Project: IEEE P802.15 Working Group for Wireless Personal Area Networks (WPANs)*, Doc. No. IEEE 802.15-03/267r6, Sep. 17, 2003.

Batra, Anuj , et al., "Multi-band OFDM Physical Layer Proposal for IEEE 802.15 Task Group 3a", *Project: IEEEW 802.15 Working Group for Wireless Personal Area Networks (WPANs)*, Doc. No. IEEE 802.15-03/268r2, Nov. 10, 2003.

Gandolfo, Pierre , et al., "802.15.3 Overview/Update", *WiMedia Presentation*, Oct. 2002.

Graf, Urs U., et al., "Fourier Gratings as THz Local Oscillator Multiplexer", Kosma, I. *Physikalisches Institut*, Universitat zu Koln, Zulpicher Str. 77, 50937 Koln, Germany, 1999.

Kusuma, Julius , et al., "Sampling with Finite Rate of Innovation: Channel and Timing Estimation for UWB and GPS", *2003 IEEE International Conference on Communications*, vol. 1, pp. 3540-3544, May 11, 2003.

\* cited by examiner

BROADBAND RADIO TRANSCEIVER WITH OPTICAL TRANSFORM

FIELD OF THE DISCLOSURE

This disclosure relates generally to the fields of wireless communications and silicon photonics. In particular, the disclosure relates to use of an optical transform to perform efficient modulation in ultra wideband radio systems.

BACKGROUND OF THE DISCLOSURE

Ultra wideband (UWB) radio systems provide large bandwidths. Deployment of UWB systems at low power levels is permitted within the 3.1-10.6 GHz spectrum (typically expected at 6 GHz or more).

State of the art modulations schemes such as orthogonal frequency domain multiplexing (OFDM) can maintain orthogonality while splitting wide spectrum signals into subbands or combining sub-bands into wide spectrum signals. Currently, only bandwidths of less than 100 MHz have been able to exploit OFDM due to its large processing requirements. Even the high end digital samplers at 1-2 GHz, are still 6 times slower today than what may be needed. Unfortunately the digital signal processing power and sampling rates required by such state of the art modulation schemes may be prohibitive for UWB bandwidths in electronic circuitry anytime in the near future.

BRIEF DESCRIPTION OF THE DRAWINGS

The present invention is illustrated by way of example and not limitation in the figures of the accompanying drawings.

DETAILED DESCRIPTION

Disclosed herein are processes and apparatus for an ultra wideband transceiver with optical transforms. One embodiment of a receiving apparatus includes an antenna to receive an ultra wideband radio signal having a plurality of modulation frequencies. A low noise amplifier is coupled with the antenna to drive a laser source from the ultra wideband radio signal to produce an optical signal having a plurality of spectral components. A diffraction grating transforms the optical signal into its spectral components. An array of photo-detectors converts the spectral components into electronic signals corresponding to the plurality of modulation frequencies.

An embodiment of a transmitting apparatus includes an array of laser emitters driven by electronic signals corresponding to a plurality of channel modulation frequencies to produce optical signals corresponding to a plurality of spectral components. A diffraction grating inverse-transforms the spectral components into a composite optical signal. A photo-detector converts the composite optical signal into a composite electronic signal including the plurality of modulation frequencies. An amplifier amplifies the composite electronic signal for transmission as an ultra wideband radio signal.

These and other embodiments of the present invention may be realized in accordance with the following teachings and it should be evident that various modifications and changes may be made in the following teachings without departing from the broader spirit and scope of the invention. It will be appreciated that while examples presented below illustrate using optical transforms for orthogonal frequency domain multiplexing (OFDM) in an ultra wideband (IEEE Std. 802.15.3a will be available from standards.ieee.org/getieee802) transceiver, the techniques disclosed are more broadly applicable. For example, systems using the IEEE's 802.11a (available from standards.ieee.org/getieee802) in the United States, titled "High Speed Physical Layer in the 5 GHz band," or systems using the European Telecommunications Standards Institute's HiperLAN/2 (available from portal.etsi.org/bran/kta/Hiperlan/hiperlan2.asp), which stands for "High Performance Radio Local Area Network," may also make advantageous use of such techniques. The specification and drawings are, accordingly, to be regarded in an illustrative rather than restrictive sense and the invention measured only in terms of the accompanying claims.

Figure 1:
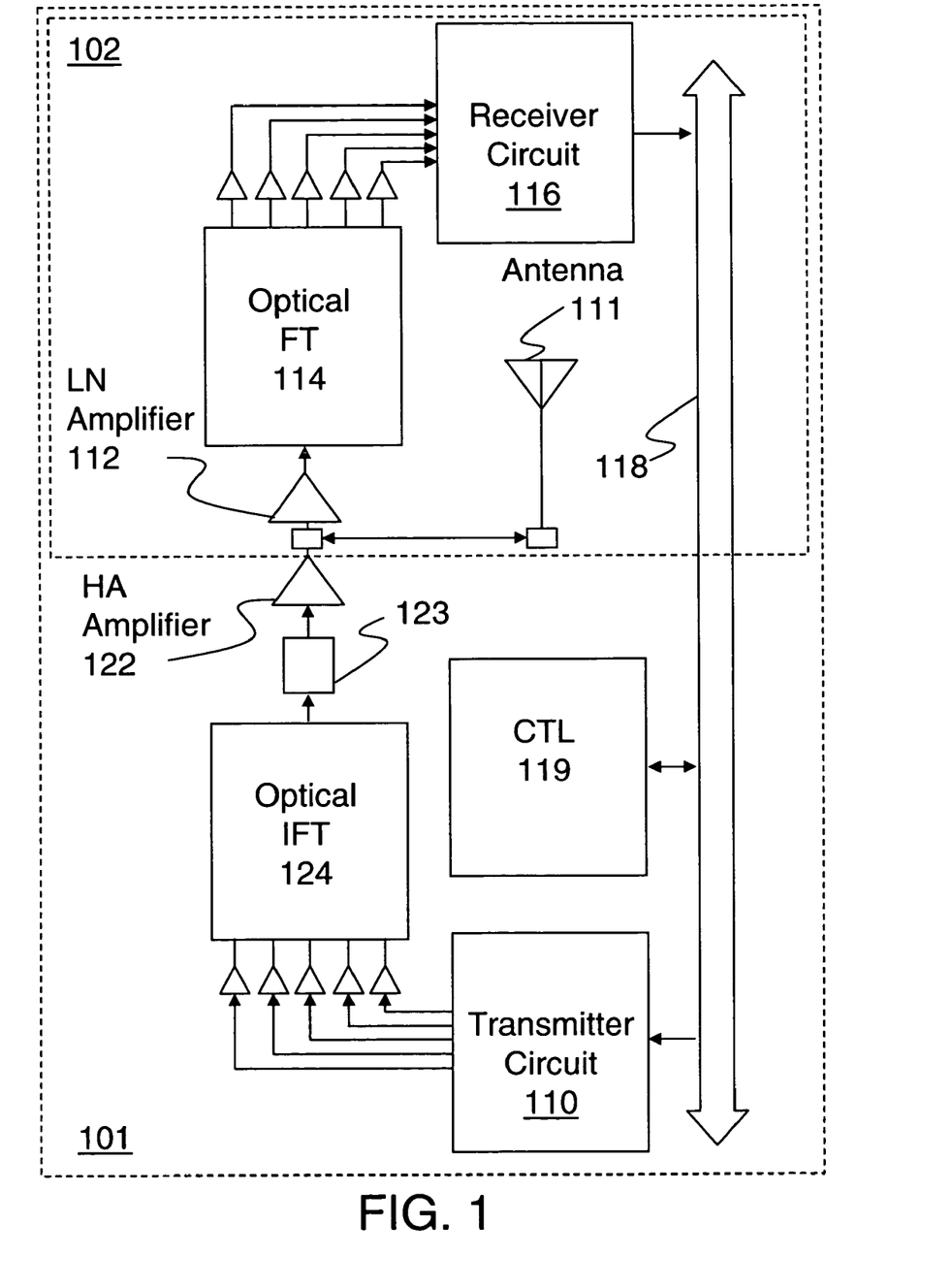
FIG. 1 illustrates one embodiment of an ultra wideband transceiver radio system with optical transforms.

FIG. 1 illustrates one embodiment of an ultra wideband transceiver radio system 101 with optical transforms 114 and 124. In receiver radio 102, an antenna 111 may receive a first ultra wideband radio signal having a plurality of modulation frequencies. A low noise amplifier 112 coupled with the antenna 111 drives a laser source of optical transform 114 from the first ultra wideband radio signal to produce an optical signal.

Optical transform 114 separates the first optical signal into its spectral components, substantially performing the function of a Fourier transform. Photo-detectors convert the separate spectral components into a plurality of electronic signals that correspond to the plurality of modulation frequencies and transmit the plurality of electronic signals to receiver circuitry 116. Receiver circuit 116 may perform well known operations of OFDM, such as demapping, deinterleaving, and forward-error-correction (FEC) decoding.

Receiver circuit 116 is coupled with transmitter circuit 110 and control circuit 119 via bus 118. Transmitter circuit 110 may perform well known operations of OFDM such as FEC convolutional encoding, interleaving and mapping. A second plurality of electronic signals corresponding to the plurality of modulation frequencies drive laser emitters to produce a plurality of optical signals of corresponding spectral components. Optical inverse transform 124 consolidates the plurality of optical signals into a second optical signal including their corresponding spectral components, substantially performing the function of an inverse-Fourier transform. A photo-detector converts the second optical signal into a composite electronic signal including the plurality of modulation frequencies and transmits the composite electronic signal to processing block 123. Processing block 123 may perform well known operations of OFDM, such as guard interval (GI) addition, symbol wave shaping and interphase/quadrature (IQ) modulation. A high power amplifier 122 coupled with antenna 111, amplifies the composite electronic signal including the plurality of modulation frequencies for transmission by antenna 111 as a second ultra wideband radio signal.

It will be appreciated that a UWB transceiver radio system using optical transforms 114 and 124 may provide for optical processing of GHz wide spectrum, which may not be possible anytime in the near future for electronic processing techniques. For example, state-of-the-art electronic samplers currently digitize samples at rates of 1-1.5 GHz, but to meet the Nyquist criteria for 6 GHz of bandwidth would require at least a 12 GHz sampler. Therefore, even if such samplers were available, optical processing may provide for solutions at reduced cost and reduced power consumption. It will also be appreciated that transceiver radio systems may also benefit from an optical transform only in the receiver or in the transmitter, rather than both.

Figure 2A:
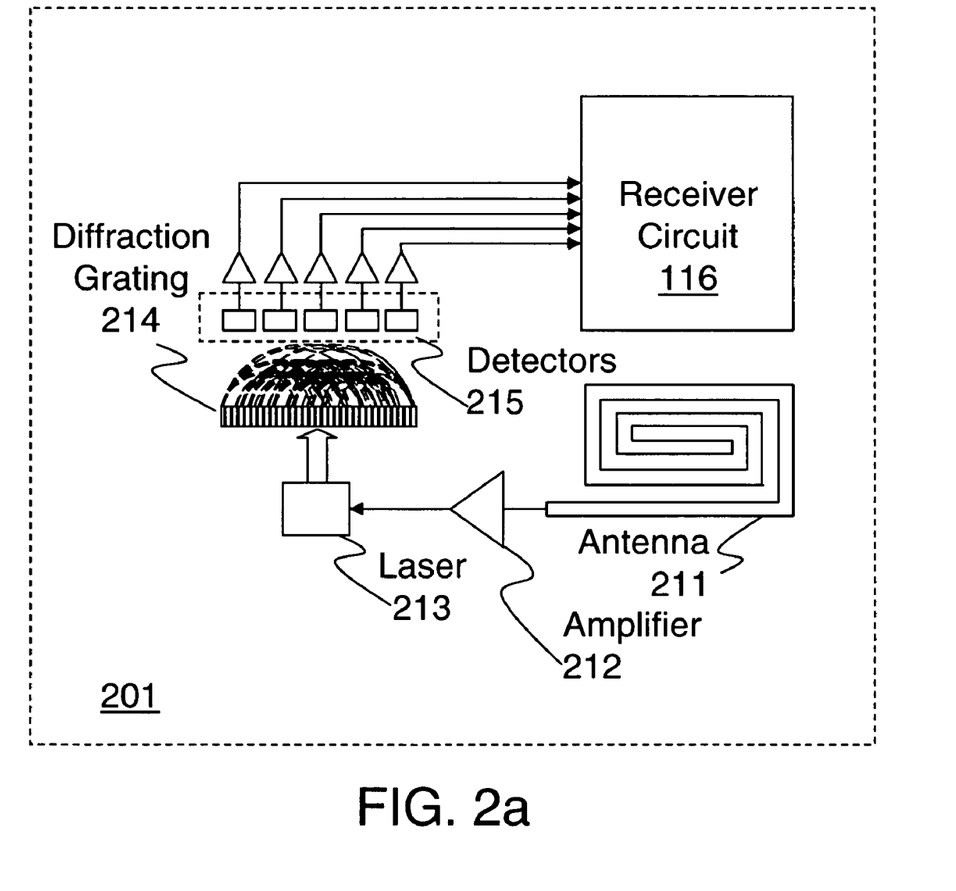
FIGS. 2*a*-2*b* illustrate embodiments of ultra wideband radio receiver apparatus with optical transforms.

FIG. 2a illustrate one embodiment of ultra wideband radio receiver apparatus 201 with an optical transform. Antenna 211 may receive an ultra wideband radio signal having a plurality of modulation frequencies. Low noise amplifier 212 is coupled with antenna 211 to drive a laser source 213 from the ultra wideband radio signal to produce an optical signal having a plurality of spectral components. Laser source 213 may be an edge emitting laser, such as a Fabry-Perot laser fir example, or may be a vertical cavity surface-emitting (VCSEL) laser. Diffraction grating 214 transforms the optical signal into its spectral components. Transforming the optical signal is accomplished by transmitting the optical signal through diffraction grating 214. A plurality of photo-detectors 215 convert the optical spectral components into electronic signals corresponding to the plurality of modulation frequencies and transmits the electronic signals to receiver circuitry 116. As in FIG. 1, receiver circuit 116 may perform well known operations of OFDM, such as demapping, deinterleaving, and FEC decoding.

Figure 2B:
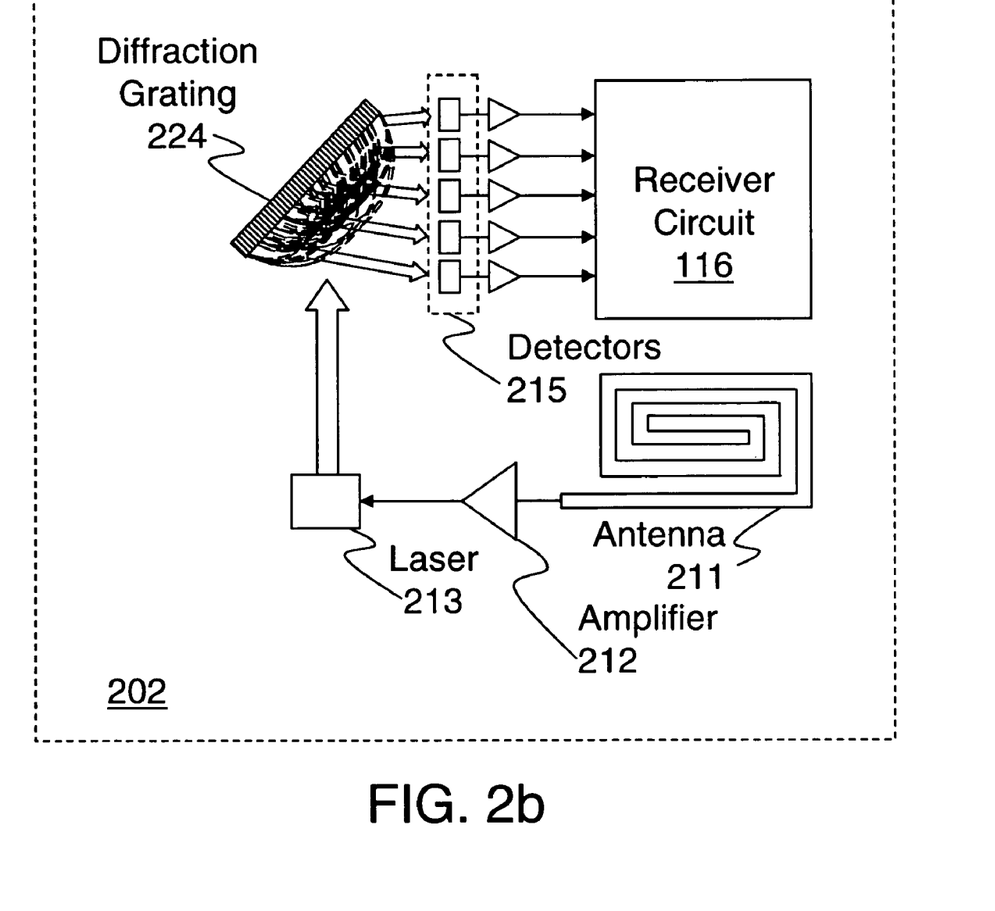

FIG. 2b illustrate an alternative embodiment of ultra wideband radio receiver apparatus 202 with an optical transform. In similarity to FIG. 2a, antenna 211 may receive an ultra wideband radio signal having a plurality of modulation frequencies and amplifier 212 drives laser source 213 from the ultra wideband radio signal to produce an optical signal having a plurality of spectral components. Diffraction grating 224 transforms the optical signal into its spectral components. In this case, transforming the optical signal is accomplished by reflecting the optical signal with diffraction grating 224. Photo-detectors 215 convert the optical spectral components into electronic signals corresponding to the plurality of modulation frequencies and transmits the electronic signals to receiver circuitry 116.

Figure 3A:
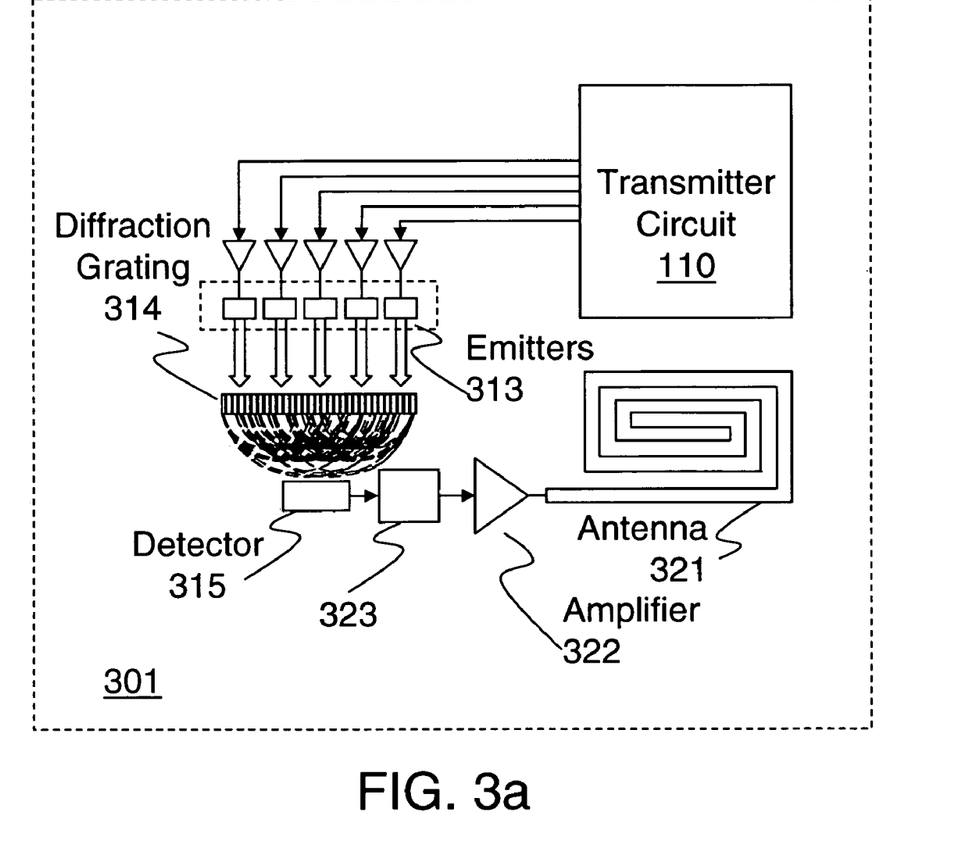
FIGS. 3*a*-3*b* illustrate embodiments of ultra wideband radio transmitter apparatus with optical inverse transforms.

FIG. 3a illustrates one embodiment of an ultra wideband radio transmitter apparatus 301 with an optical inverse transform. A plurality of laser emitters 313 are driven by electronic signals corresponding to a plurality of modulation frequencies to produce optical signals corresponding to a plurality of spectral components. The plurality of laser emitters 313 may comprise edge emitting lasers and/or VCSEL lasers. For one embodiment, emitters 313 comprise a coherent array of emitters, for example, being generated from a single laser source and independently modulated with electro-absorption modulators or lithium-niobate modulators. Diffraction grating 314 inverse transforms the optical signals into a composite optical signal including the plurality of spectral components. Inverse-transform of the optical signals is accomplished by transmitting the optical signals through diffraction grating 314. Photo-detector 315 converts the composite optical signal including the plurality of spectral components into a composite electronic signal including the plurality of modulation frequencies and transmits the composite electronic signal to processing block 323. As above, processing block 323 may perform well known operations of OFDM, such as GI addition, symbol wave shaping and IQ modulation. A high power amplifier 322 is coupled with an antenna 321 to amplify the composite electronic signal including the plurality of modulation frequencies for transmission by antenna 321 as an ultra wideband radio signal.

Figure 3B:
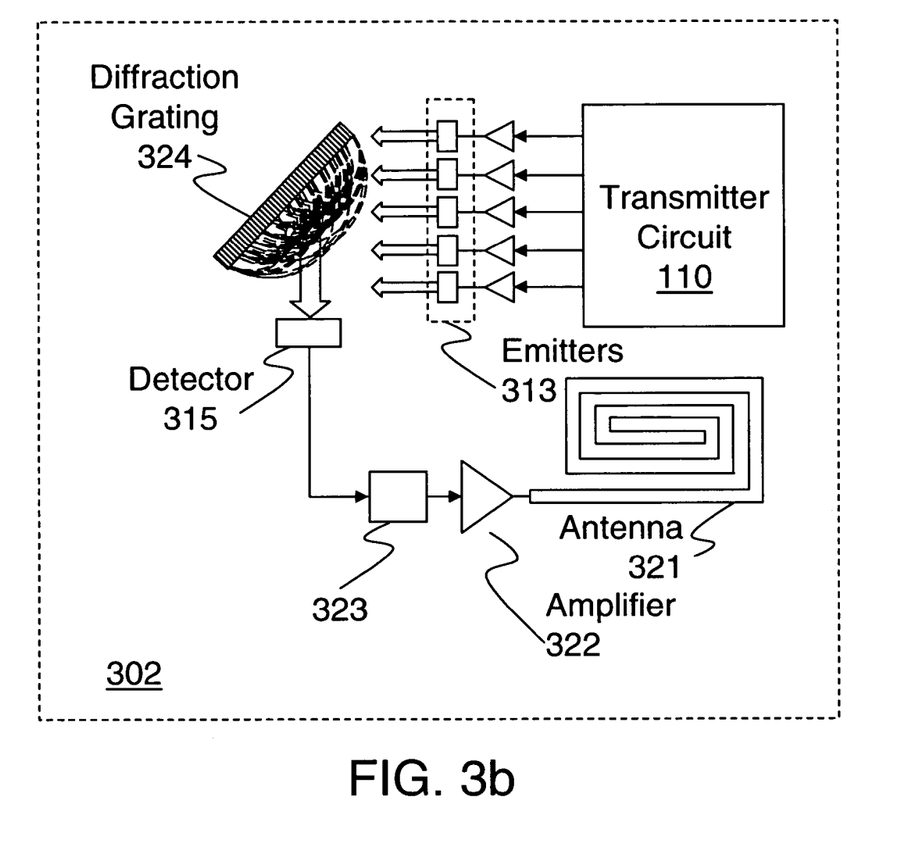

FIG. 3b illustrates an alternative embodiment of an ultra wideband radio transmitter apparatus 302 with an optical inverse transform. In similarity to FIG. 3a, laser emitters 313 are driven by electronic signals corresponding to a plurality of modulation frequencies to produce optical signals. Diffraction grating 324 inverse transforms the optical signals into a composite optical signal. Inverse transform of the optical signals is accomplished by reflecting the plurality of optical signals with the diffraction grating 324. Photo-detector 315 converts the composite optical signal into a composite electronic signal including the plurality of modulation frequencies and transmits the composite electronic signal to processing block 323, which transmits to high power amplifier 322 to amplify the composite electronic signal for transmission by antenna 321 as an ultra wideband radio signal.

It will be appreciated that through the use of optical based Fourier transforms and inverse-Fourier transforms, reductions may be made in the speed and power requirements of the electronic processing components while still providing for very high UWB system performance.

Figure 4:
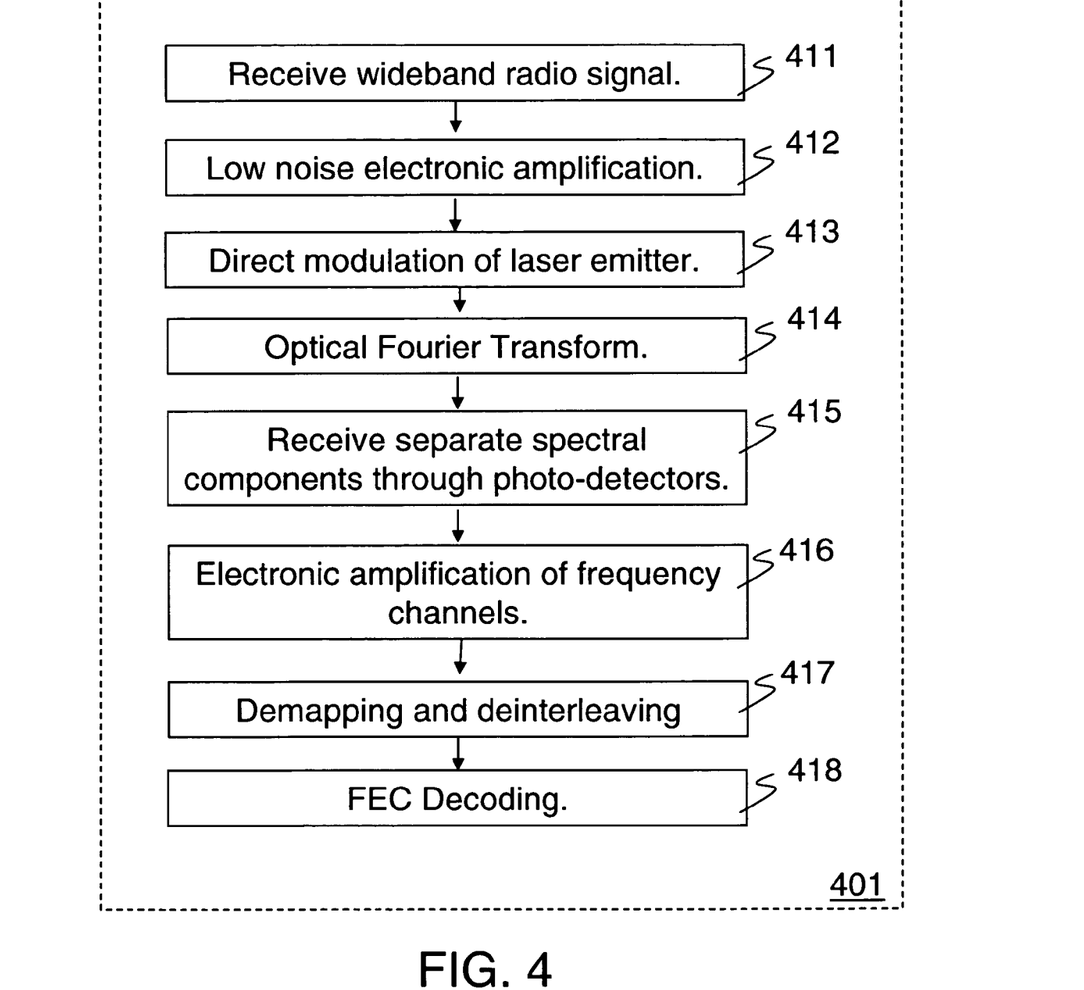
FIG. 4 illustrates a flow diagram of one embodiment of a process for orthogonal frequency domain multiplexing (OFDM) with optical transforms in an ultra wideband receiver.

FIG. 4 illustrates a flow diagram of one embodiment of a process for OFDM with optical transforms in an ultra wideband receiver. Process 401 and other processes herein disclosed are performed by processing blocks that may comprise dedicated electronic or photonic hardware or software or firmware operation codes executable by general purpose machines or by special purpose machines or by a combination of both. It will be appreciated that while process 401 and other processes herein disclosed are illustrated, for the purpose of clarity, as processing blocks with a particular sequence, some operations of these processing blocks may also be conveniently performed in parallel or their sequence may be conveniently permuted so that the some operations are performed in different orders, or some operations may be conveniently performed out of order.

In processing block 411, a wideband radio signal having a plurality of modulation frequencies is received, for example a UWB signal. Processing proceeds in processing block 412 where the ultra wideband radio signal is electronically amplified, for example through a low noise amplifier 112, to directly modulate a laser emitter in processing block 413 to produce an optical signal having a plurality of spectral components. In processing block 414, an optical Fourier transform is performed on the optical signal. Processing continues in processing block 415 where the separate spectral components are received and converted by corresponding photo-detectors into electronic signals corresponding to modulation frequency channels.

It will be appreciated that while examples herein presented illustrate the use of optical Fourier transforms for OFDM, for example in a UWB transceiver (IEEE Std. 802.15.3a, not currently available), or for example in a system using IEEE Std. 802.11a (available from standards.ieee.org/getieee802); it is not necessary that any particular OFDM standard be used, and therefore processing blocks which may perform processing specific to OFDM may be considered optional. In processing block 416 the electronic signals are amplified and processing optionally proceeds to processing block 417 where OFDM demapping and deinterleaving occurs. Finally in processing block 418 optional forward-error-correction (FEC) decoding occurs.

Figure 5:
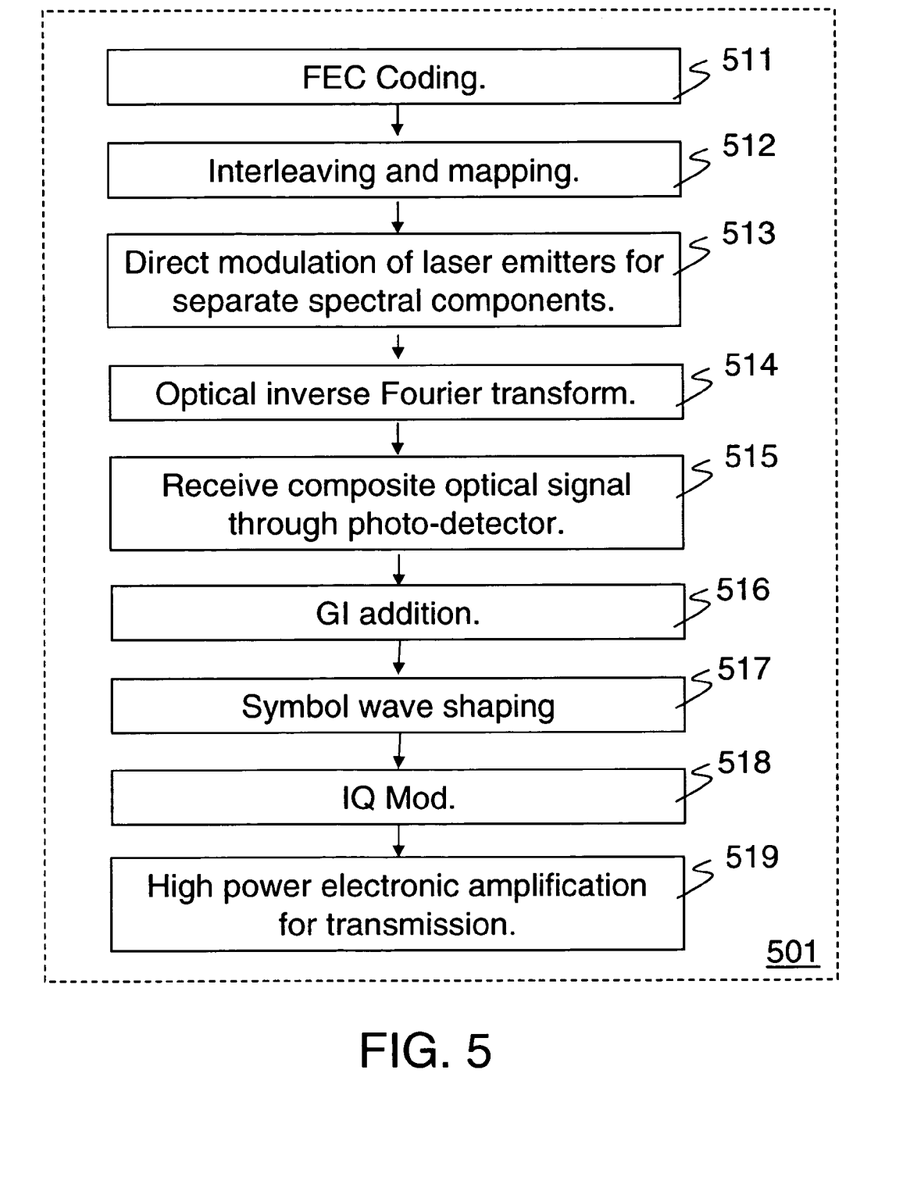
FIG. 5 illustrates a flow diagram of one embodiment of a process for OFDM with optical transforms in an ultra wideband transmitter.

FIG. 5 illustrates a flow diagram of one embodiment of a process for OFDM with optical inverse-Fourier transforms in an ultra wideband transmitter. In processing block 511, optional FEC convolutional encoding occurs. Processing then optionally proceeds to processing block 512 where OFDM interleaving and mapping occurs. Processing then proceeds to processing block 513 where a plurality of laser emitters are directly modulated by electronic signals corresponding to a plurality of modulation frequencies to produce optical signals corresponding to a plurality of spectral components. In processing block 514 an optical inverse-Fourier transform is performed on the optical signals to produce a composite optical signal including the plurality of spectral components. In processing block 515, a photo-detector receives and converts the composite optical signal including the plurality of spectral components into a composite electronic signal including the plurality of modulation frequencies. Processing optionally proceeds in processing blocks 516-518 where OFDM processing: guard interval (GI) addition, symbol wave shaping and interphase/quadrature (IQ) modulation occurs. Processing then proceed to processing block 519 where the composite electronic signal including the plurality of modulation frequencies is amplified for transmission, for example as a UWB radio signal.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A method comprising:
    receiving an orthogonal frequency domain multiplexing (OFDM) broadband radio signal having a plurality of modulation frequencies;
    amplifying the OFDM broadband radio signal to drive a laser source to produce an optical signal having a plurality of spectral components;
    optically transforming the optical signal to separate the plurality of spectral components into a plurality of corresponding photo-detectors;
    performing an optical based time-domain Fourier transform on the plurality of spectral components while maintaining orthogonality; and
    converting the plurality of spectral components into a plurality of separate electronic signals corresponding to the plurality of modulation frequencies.

2. The method of claim 1 wherein optically transforming the optical signal is accomplished by transmitting the optical signal through a diffraction grating.

3. The method of claim 1 wherein optically transforming the optical signal is accomplished by reflecting the optical signal off a diffraction grating.

4. The method of claim 1 wherein said laser source is a vertical cavity surface emitting (VCSEL) laser.

5. The method of claim 1 wherein said laser source is edge emitting.

6. The method of claim 1 further comprising:
    demapping said separate electronic signals corresponding to the plurality of modulation frequencies.

7. The method of claim 6 further comprising:
    deinterleaving said separate electronic signals corresponding to the plurality of modulation frequencies.

8. The method of claim 1 wherein the broadband radio signal is an ultra wideband radio signal.

9. The method of claim 8 further comprising Fourier transforming the optical signal to separate the plurality of spectral components.

10. A method comprising:
    driving a plurality of laser emitters from a plurality of electronic signals of a plurality of modulation frequencies of an orthogonal frequency domain multiplexing (OFDM) signal to produce a plurality of optical signals of a plurality of spectral components;
    performing an optical based time-domain Fourier transform on the plurality of spectral components while maintaining orthogonality;
    optically inverse transforming the plurality of optical signals into a composite optical signal including the plurality of spectral components;
    converting the composite optical signal including the plurality of spectral components into a composite electronic signal including the plurality of modulation frequencies; and
    amplifying the composite electronic signal including the plurality of modulation frequencies for transmission as an ultra wideband radio signal.

11. The method of claim 10 wherein optically inverse transforming the plurality of optical signals is accomplished by transmitting the plurality of optical signals through a diffraction grating.

12. The method of claim 10 wherein optically inverse transforming the plurality of optical signals is accomplished by reflecting the plurality of optical signals off a diffraction grating.

13. The method of claim 10 wherein said plurality of laser emitters are VCSEL.

14. The method of claim 10 wherein said plurality of laser emitters are edge emitting.

15. The method of claim 10 further comprising:
    interleaving and mapping said plurality of electronic signals of the plurality of modulation frequencies.

16. The method of claim 15 further comprising:
    symbol wave shaping and IQ modulating said composite electronic signal including the plurality of modulation frequencies.

17. A method of claim 10 further comprising transmitting said composite electronic signal including the plurality of modulation frequencies as a broadband radio signal.

18. A method of claim 17 further comprising inverse-Fourier transforming the plurality of optical signals.

19. An apparatus comprising:
    an antenna to receive a broadband radio signal having a plurality of modulation frequencies;
    a low noise amplifier coupled with the antenna to drive a laser source from the broadband radio signal to produce an optical signal having a plurality of spectral components;
    a diffraction grating to optically transform the optical signal into the plurality of spectral components and to perform an optical based time-domain Fourier transform on the plurality of spectral components while maintaining orthogonality; and
    a plurality of photo-detectors to convert the plurality of spectral components into a plurality of electronic signals corresponding to the plurality of modulation frequencies.

20. The apparatus of claim 19 wherein said transform of the optical signal is accomplished by separating the optical signal through the diffraction grating.

21. The apparatus of claim 19 wherein said transform of the optical signal is accomplished by reflecting the plurality of optical signals with the diffraction grating.

22. The apparatus of claim 19 wherein said laser source is VCSEL.

23. The apparatus of claim 19 wherein said laser source is edge emitting.

24. The apparatus of claim 19 wherein the broadband radio signal is an ultra wideband radio signal.

25. The apparatus of claim 19 wherein the diffraction grating optically transforms the optical signal into a plurality of Fourier components.

26. An apparatus comprising:
 a plurality of coherent laser emitters, a plurality of electronic signals corresponding to a plurality of modulation frequencies to drive said plurality of coherent laser emitters to produce a plurality of optical signals corresponding to a plurality of spectral components;
 a diffraction grating to optically inverse transform the plurality of optical signals into a composite optical signal including the plurality of spectral components and to perform an optical based time-domain Fourier transform on the plurality of spectral components while maintaining orthogonality;
 a photo-detector to convert the composite optical signal including the plurality of spectral components into a composite electronic signal including the plurality of modulation frequencies;
 an antenna to transmit a broadband radio signal having a plurality of modulation frequencies; and
 a high power amplifier coupled with an antenna to amplify the composite electronic signal including the plurality of modulation frequencies for transmission by the antenna as said broadband radio signal.

27. The apparatus of claim 26 wherein said inverse transform of the plurality of optical signals is accomplished by transmitting the plurality of optical signals through the diffraction grating.

28. The apparatus of claim 26 wherein said inverse transform of the plurality of optical signals is accomplished by reflecting the plurality of optical signals with the diffraction grating.

29. The apparatus of claim 26 wherein said plurality of laser emitters are VCSEL.

30. The apparatus of claim 26 wherein said plurality of laser emitters are edge emitting.

31. The apparatus of claim 26 wherein the broadband radio signal is an ultra wideband radio signal.

32. The apparatus of claim 31 wherein the diffraction grating inverse-Fourier transforms the plurality of optical signals.

* * * * *